United States Patent
Arnold et al.

(10) Patent No.: US 7,435,040 B1
(45) Date of Patent: Oct. 14, 2008

(54) APPARATUS AND METHOD FOR THE REAMING OF A HOLE IN A WORK SURFACE

(75) Inventors: James D. Arnold, Haltom City, TX (US); Shane Enman, Claremore, OK (US)

(73) Assignee: American Airlines, Inc., Fort Worth, TX (US)

( * ) Notice: Subject to any disclaimer, the term of this patent is extended or adjusted under 35 U.S.C. 154(b) by 380 days.

(21) Appl. No.: 11/125,011

(22) Filed: May 9, 2005

(51) Int. Cl.
*B23B 35/00* (2006.01)

(52) U.S. Cl. .................. 408/1 R; 408/93; 408/101; 408/110

(58) Field of Classification Search ............ 408/1 R, 408/101–103, 137, 115 R, 97, 709, 72 R, 408/79–80, 93–94, 110
See application file for complete search history.

(56) References Cited

U.S. PATENT DOCUMENTS

| | | | | |
|---|---|---|---|---|
| 403,040 A | * | 5/1889 | Doyle et al. ............... 408/95 |
| 1,331,052 A | * | 2/1920 | Davis ....................... 408/79 |
| 1,373,856 A | * | 4/1921 | Bosch ....................... 408/82 |
| 1,597,468 A | * | 8/1926 | Holehouse ................ 408/111 |
| 1,761,070 A | * | 6/1930 | Christensen .............. 408/232 |
| 2,792,727 A | * | 5/1957 | McCuen .................... 408/97 |
| 3,230,834 A | * | 1/1966 | Bohannon ................ 408/83.5 |
| 3,764,204 A | * | 10/1973 | Kammeraad ............... 408/75 |
| 3,799,687 A | * | 3/1974 | Anderson .................. 408/75 |
| 3,800,391 A | * | 4/1974 | Westbrook ................ 29/255 |
| 6,394,713 B1 | | 5/2002 | Yates, Sr. |
| 6,508,613 B2 | | 1/2003 | Cline et al. |
| 6,813,843 B1 | | 11/2004 | Faubion |
| 6,844,518 B1 | | 1/2005 | Coons et al. |
| 6,860,682 B1 | | 3/2005 | Le Picq |

FOREIGN PATENT DOCUMENTS

GB        2058613 A    *  4/1981

* cited by examiner

*Primary Examiner*—Daniel W Howell
(74) *Attorney, Agent, or Firm*—Haynes and Boone, LLP

(57) ABSTRACT

An apparatus and method is provided for the highly accurate reaming of a hole in a work surface. A reaming device is positioned within a base unit and positioning bracket of the present apparatus in alignment with the hole to be reamed in the work surface. The reaming device is advanced through the work surface by means of a reamer driver assembly while being rotated by means of a drive motor or similar rotational means to produce a cutting action, resulting in a precise, highly accurate reaming.

15 Claims, 3 Drawing Sheets

APPARATUS AND METHOD FOR THE REAMING OF A HOLE IN A WORK SURFACE

CROSS REFERENCE

This application is not related to any pending application.

STATEMENT OF FEDERALLY SPONSORED RESEARCH/DEVELOPMENT REFERENCES TO SEQUENCE LISTING

This application is not referenced to any microfiche appendix.

BACKGROUND OF THE INVENTION

The maintenance of aircraft often involves the performance of maintenance activities within a confined work space within the aircraft. Such activities can include the inspection of aircraft parts and structures, along with the replacement and repair of parts. Such maintenance is often required as a consequence of airworthiness directives issued by the Federal Aviation Administration (FAA), which specify detailed and exacting standards to which aircraft maintenance is to be performed.

A non-limiting example of such an airworthiness directive is AD 2001-02-09 which requires a lower chord tang/bolt hole inspection on Boeing 757 aircraft at a specified frequency of Total Ship Cycles (TSC) over the life of the aircraft. The lower chord on an aircraft is the structure which helps to transfer the operational loads of the engine and secure the engine via the pylori strut to the wing of the aircraft. The lower chord is located within the pylori between the engine and the wing, with a series of bolts inserted through these structures securing them together. This inspection is required at specified intervals to assess the structural integrity of the lower chord and the ability of the chord assembly to sustain the operational load of the engine pylori. The assessment of the integrity of the bolt holes in the lower chord is therefore an integral part of the required inspection.

Should the inspection of the lower chord reveal crack indications in the lower chord bolt holes, installation of a new midchord configuration and possible replacement of the lower chord may be necessary. Installation of the new midchord configuration of the lower chord, if required, is a costly and time-consuming process, resulting in a typical out of service time for an aircraft of at least 30 days at a cost often exceeding $200,000. However, if crack indications are limited and are found to exist within certain limits specified in the airworthiness directive, oversizing of the bolt hole to remove the crack, rather than installation of the new midchord, may be possible. Cracks which are not addressed, through either oversizing until removal or a repair, can continue to increase in length and can make replacement of the lower chord necessary.

The required initial inspection requires an insurance cut which consists of the reaming or oversizing of the lower chord bolt holes to increase the diameter of the holes. This oversizing is performed in increments until the cracks, or fatigued material, are removed. This oversizing, through removal of the fatigued material and installation of larger bolts in the lower chord bolt holes, will give the lower chord/pylori structure the necessary strength for continued operations, and defer the need for installation of a new midchord configuration specified under the airworthiness directive.

It can be seen, therefore, that the accomplishment of the oversizing repair on the lower chord can prevent cracks which would otherwise require premature installation of the new midchord configuration and possible lower chord replacement. This oversizing repair thus shortens the time an aircraft would need to be out of service and reduces the total maintenance costs related to this airworthiness directive.

In order to accomplish such a repair, an apparatus and method for the accurate reaming of the lower chord bolt holes is required. Such a repair is difficult given the thickness of the chord assembly, which consists of three metal surfaces positioned back-to-back, each approximately ¼ of an inch thick, thereby requiring drilling through a steel work surface approximately ¾ of an inch in total thickness. Attempts to effectuate such reaming "free-hand", without the use of a guide, would typically lead to inaccurate, misaligned reamings, resulting in damage to the lower chord structure.

The difficulty of performing the oversizing noted above is increased as well whenever limited working space is presented and within which the operation must be accomplished. In the instance of the above oversizing operation, the lower chord is typically accessed through a small access panel on the aircraft strut assembly, with the access panel often measuring no more than one square foot. Once accessed, the working space around the lower chord itself is likewise limited. It is difficult for the person performing this repair, as well as other positionally critical drilling operations, to be able to perform an accurate reaming, particularly so that the oversizing is performed within the required tolerances and aligned with the bolt holes, within such a confined work space. If not performed properly, the reaming can result in damage to the lower chord, necessitating premature installation of the new midchord configuration, thereby resulting in increased out of service time and maintenance costs which the oversizing was intended to prevent.

Therefore, there is a need for a tool and method to provide a precise, highly accurate reaming of a work surface in a confined work space.

DETAILED DESCRIPTION OF THE INVENTION

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

Figure 1:
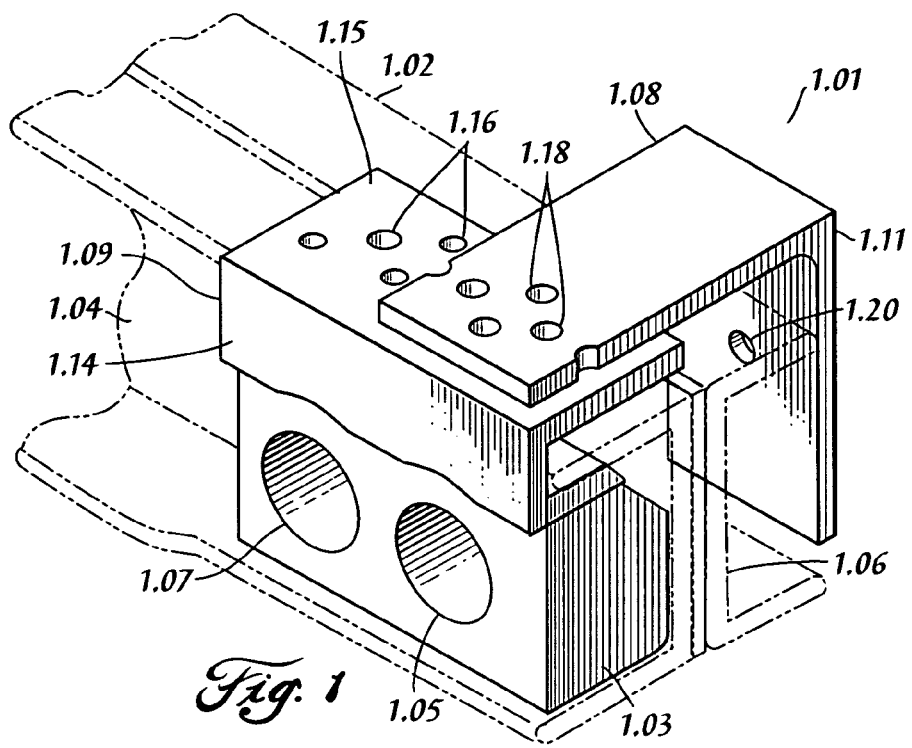
FIGS. 1, 2 and 3 illustrate the invention's apparatus when positioned upon an aircraft surface in one embodiment of the present invention.

FIG. 1 is an illustration of the apparatus of the instant invention and a non-limiting application of its practice with respect to aircraft component reaming. In FIG. 1 an anterior view is shown where a guide fixture 1.01 is positioned on an airplane surface 1.02, here a lower chord of a Boeing 757 aircraft. The guide fixture 1.01 consists of a base 1.03 which has been formed to rest within a first side 1.04 of the work surface 1.02. As will readily be appreciated by those skilled in the art, any appropriate size and dimension of the base to fit the work surface can be facilitated in the practice of the invention in other applications beyond the non-limiting example of oversizing aircraft components. The base 1.03 contains a first aperture 1.05 through which a reaming device will extend from the second side 1.06 of the work surface, through an existing hole on the work surface 1.02, and through the first aperture 1.05.

Figure 2:
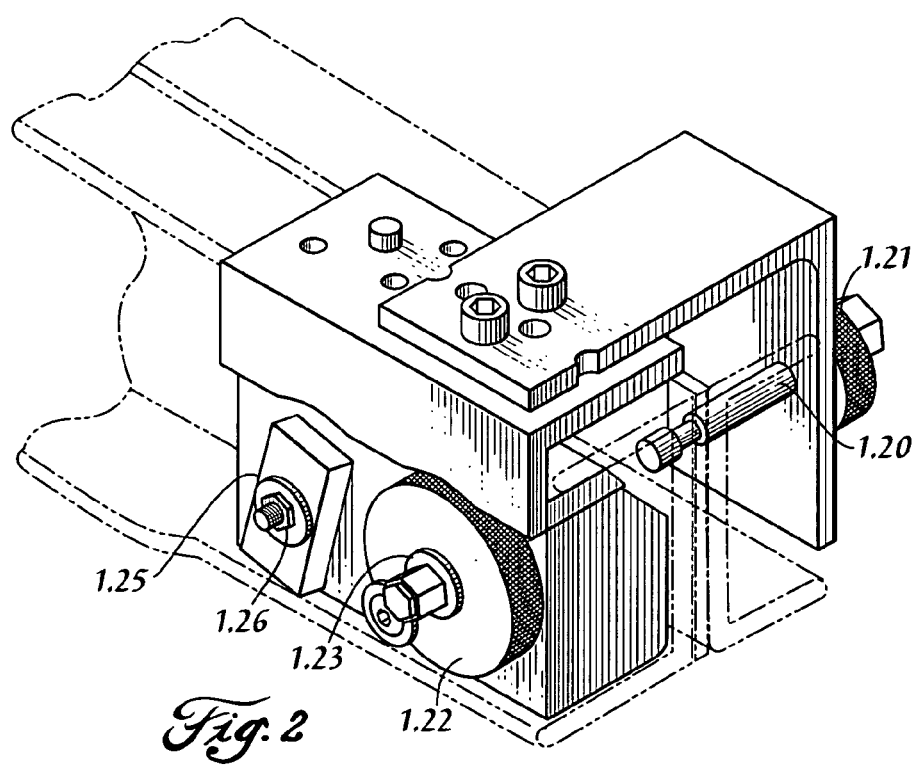

The first aperture 1.05 is designed so as to accommodate a sleeve assembly depicted as 1.22 in FIG. 2 which will accept a first end of the reaming device and provide a means for rotating the reaming device through the work surface 1.02. The sleeve 1.22 can accommodate a pilot bushing or similar means of guiding a reaming device through the hole in the work surface and extending through the first aperture 1.05. The base 1.03 contains a second aperture 1.07 through which a bolt clamp 1.25 as depicted in FIG. 2, or similar securing means, can be inserted in order to secure the base 1.03 to the first side 1.04 of the work surface 1.02. The first aperture 1.05 and the second aperture 1.07 are both aligned with the holes to be reamed in the underlying work surface. Both apertures can be deployed interchangeably so that a securing means can be inserted through the first aperture 1.05, while the second aperture 1.07 can accommodate a sleeve to accept one end of a reaming device to rotate the reaming device through the second aperture 1.07.

The base 1.03 is additionally secured to the first side 1.04 of the work surface by means of an adjustable positioning bracket 1.08. The positioning bracket can be segmented so that it comprises 2 or more pieces. In FIG. 1 it is shown where the positioning bracket 1.08 is segmented so that it comprises a brace 1.09 and a foot 1.11. The brace 1.09 is generally U-shaped, with the lower end 1.14 of the brace 1.09 extending over the top of the base 1.03 to secure the base 1.03 to the work surface 1.02. The upper end 1.15 of the brace 1.09 contains one or more apertures 1.16, through which screws, bolts, or similarly intended structures are inserted to connect the foot 1.11 to the brace 1.09.

The foot 1.11 is generally L-shaped, and contains one or more apertures 1.18 to align with the apertures 1.16 of the brace 1.09, through which screws, bolts, or similarly intended structures may be inserted to secure the foot 1.11 to the brace 1.09. The foot 1.11 contains one or more apertures 1.20 which accommodate a reamer driver assembly 1.21 depicted in FIG. 2. The location of the apertures 1.18 and 1.16 allow the foot 1.11 to be variably positioned such that the aperture 1.20 of the foot 1.11 aligns with either the first aperture 1.05 or the second aperture 1.07 of the base 1.03.

Figure 6:
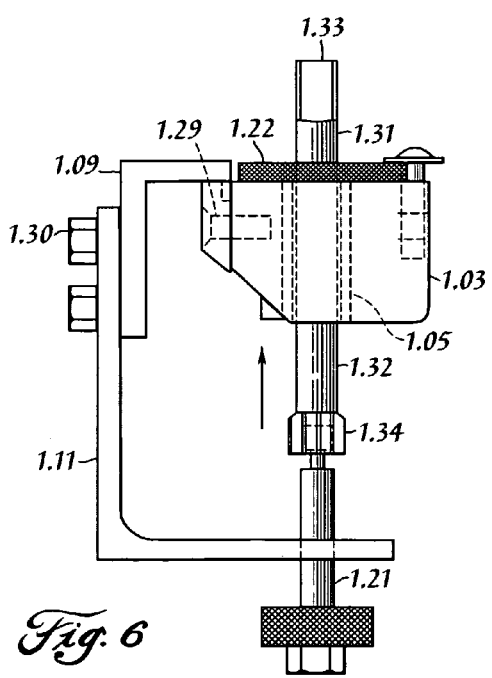

FIG. 2 is a second anterior view of the guide fixture 1.01. In this embodiment a sleeve 1.22, along with a pilot bushing 1.32 in FIG. 6, is inserted into the first aperture 1.05 of the base 1.03 of FIG. 1. An adapter 1.23 is connected to a first end of a reaming device which extends through the sleeve assembly 1.22. A drive motor or similar means of rotating the reaming device through the work surface is connected to the adapter 1.23. In one embodiment, the reaming device is positioned such that the reamer driver assembly 1.21 advances the reaming device through the work surface, in conjunction with the rotation of the reaming device via a drive motor or similar rotational means connected to the adapter 1.23. In FIG. 2 the reamer driver assembly 1.21 is shown as a thumbscrew assembly, although any suitable means of advancing the reaming device through the work surface is suitable for this purpose. In the present embodiment the reamer driver assembly 1.21 is inserted through the aperture 1.20 in order to align with and advance the reaming device by means of the turning of the thumbscrew assembly. The sleeve 1.22 and pilot bushing serve to assist in guiding the reaming device through the work surface in proper alignment with the hole to be reamed.

A bolting clamp 1.25 is inserted through the second aperture 1.07 of the base as a means of securing the base 1.03 to the work surface. The bolting clamp extends through the aperture 1.07 in FIG. 1 and through a hole in the work surface. The bolting clamp is secured at a first end of the bolting clamp at the point where it extends through the second side 1.06 of the work surface. The bolting clamp is also secured at a second end 1.26 at the point where it extends from the base.

Figure 3:
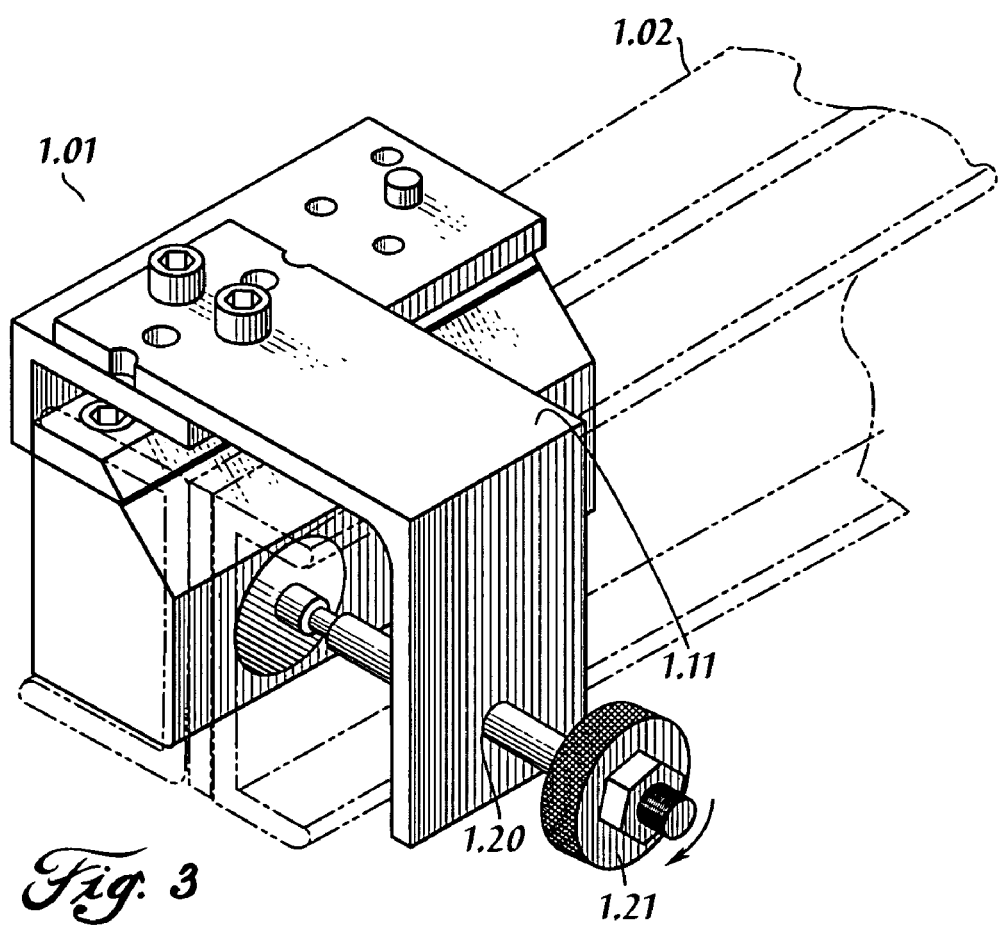

FIG. 3 is a posterior view of the guide fixture 1.01 positioned on an airplane surface 1.02. In this view is seen the foot 1.11 positioned such that the reamer driver assembly 1.21 is in place in the aperture 1.20 of the foot 1.11. The reamer driver assembly 1.21 contacts and acts to guide and advance the reaming device through the work surface to ream a hole in that work surface. In one embodiment illustrated in FIG. 3, the reamer driver assembly 1.21 comprises a thumbscrew assembly which is rotated in the direction shown in FIG. 3 to assist in the advancement of the reaming device through the work surface.

Figure 4:
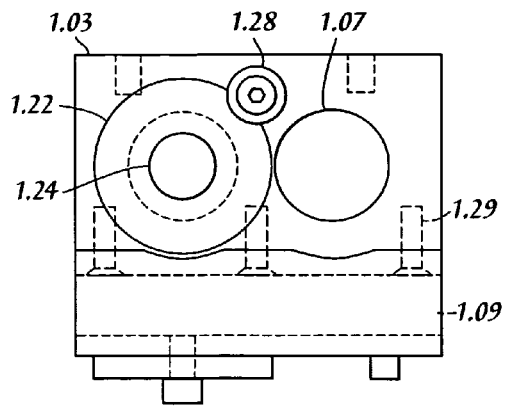
FIGS. 4, 5 and 6 illustrate top, front and side views of the invention's apparatus as practiced in one embodiment of the present invention.
Figure 5:
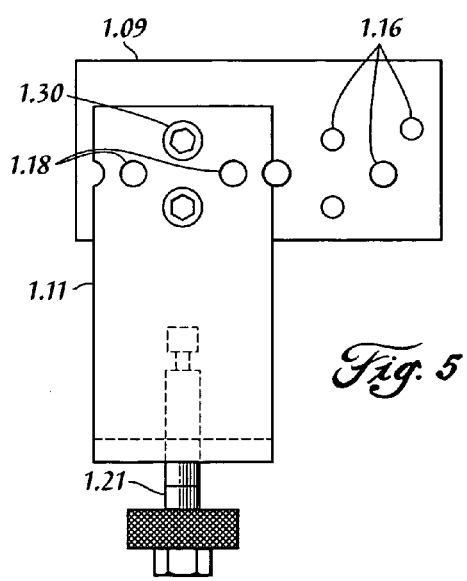

FIGS. 4, 5 and 6 illustrate front, top and side views of the invention's apparatus when practiced in its preferred embodiment. The front view in FIG. 4 illustrates the base 1.03 with two apertures 1.05 and 1.07, both aligned with the holes to be reamed in the underlying work surface. Aperture 1.05 is shown with the sleeve 1.22 inserted, which will accommodate a pilot bushing which provides the means for guiding the reaming device through the work surface and through aperture 1.05. A screw 1.28 or similarly intended structure secures the sleeve 1.22 to the base 1.03. In this embodiment, the diameters of both apertures 1.05 and 1.07 are the same, and either aperture can accommodate the sleeve 1.22. As illustrated, aperture 1.07 can be fitted with a bolting clamp to secure the base to the work surface. Screws or similarly intended structures 1.29 secure the brace 1.09 to the base 1.03.

The top view in FIG. 5 shows the position of the foot 1.11 in relation to the brace 1.09. One or more apertures 1.16 and 1.18 allow the foot 1.11 to be variably positioned along the brace 1.09 and secured in position to the brace 1.09 through the insertion of cap screws or similar securing means 1.30. The variable positioning of the foot 1.11 allows the reamer driver assembly 1.21 to be aligned with either aperture 1.05 or 1.07 in the base 1.03 of FIG. 4.

Figure 7:
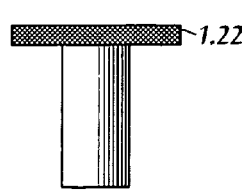
FIG. 7 illustrates a sleeve assembly of the invention's apparatus.
Figure 8:
FIG. 8 illustrates a pilot bushing assembly of the invention's apparatus.

In FIG. 6 is seen a side view of the present invention with a reaming device 1.31 inserted. The foot 1.11 secured to the brace 1.09 by capscrews or similar securing means 1.30. The base 1.03 is secured to the brace 1.09 by screws or similarly intended structures 1.29. Referring to FIGS. 6, 7 and 8, the sleeve 1.22 is inserted through the aperture 1.05. Inserted within the sleeve 1.22 is a pilot bushing 1.32 through which the shank end 1.33 of the reaming device 1.31 extends and which aligns the reaming device with the hole in the work surface to be reamed. Pilot bushings of varying diameters can be used to accept reaming devices of varying diameters, depending upon the size of the hole to be reamed. The reaming device 1.31 is guided through the work surface and through aperture 1.05 (or alternatively 1.07) of the base. The reamer driver assembly 1.21 is positioned through the foot 1.11 and along the same longitudinal axis as the aperture 1.05 (or 1.07) and the reaming device. The reamer driver assembly 1.21 is in contact with the chamfered end 1.34 of the reaming device 1.31 in order to advance the reaming device 1.31 through the hole in the work surface. An adapter 1.23 (as in FIG. 2) may be connected to the shank end 1.33 of the reaming device 1.31. A drive motor, or similar rotational means, may in turn be connected to the adapter 1.23 in order to produce a rotational cutting action of the reaming device 1.31 while the reaming device 1.31 is being advanced by means of the reamer driver assembly 1.21. The reaming device is advanced and provides the cutting action in the direction of the base as identified in FIG. 6.

In the method of the use of the present invention in the reaming of a hole in a work surface, referring to FIGS. 1 and 2, the base 1.03 is first positioned on the work surface so that a first aperture 1.05 of the base 1.03 aligns with the existing hole to be reamed in the work surface. The brace 1.09 is connected to the base 1.03 by screws or similarly intended structures 1.29. The sleeve assembly 1.22 is then inserted into the first aperture 1.05. A pilot bushing 1.32 (FIG. 8), of proper diameter of a first end of the pilot bushing corresponding to the diameter of the hole in the work surface to be reamed, is inserted into the sleeve assembly 1.22 and through the existing hole in the work surface. The pilot bushing 1.32 acts to guide the reaming device as it is advanced through the work surface.

A bolting clamp fixture or similar securing means 1.25 is next inserted into the second aperture 1.07 and an underlying second existing hole in the work surface to secure the base 1.03 to the work surface. A reaming device of proper diameter, based on the desired diameter of the hole to be reamed, is then positioned. The shank end of the reaming device is inserted through the hole in the work surface, from the second side 1.06 of the work surface, then through the pilot bushing 1.32 such that the shank end of the reaming device extends out through the first aperture 1.05 of the base 1.03.

With the reaming device in position, the foot 1.11 is then attached to the brace 1.09 by means of screws, bolts, or similarly intended structures. The reamer driver assembly 1.21, which can consist of a thumb screw assembly, is then inserted through aperture 1.20 in the foot 1.11. The foot and reamer driver assembly should be positioned such that the reamer drive assembly aligns with the axis of the reaming device and the hole to be reamed. The reamer driver assembly should be in contact with the reaming device.

Once the foot 1.11 and reamer driver assembly 1.21 are in position, an adapter 1.23 is secured onto the shank end of the reaming device, to enable a drive motor assembly, or similar means, to be installed to rotate the reaming device. The reaming device then is rotated to provide cutting action for the reaming of the hole in the work surface. The reaming device is simultaneously advanced through the hole of the work surface by means of the reamer drive assembly in the direction of the base 1.03.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed is:

1. A guide fixture for the reaming of a hole in a work surface, comprising:
   a base adapted to rest on a first surface of the work surface, comprising a first guide hole extending through the base for acceptance of a reaming device;
   a positioning bracket in adjustable communication with the base and securing the base to the first surface of the work surface, the positioning bracket comprising:
      one or more apertures;
      a first segment comprising a first end extending parallel to the first surface of the work surface and a second end extending transverse to the first surface of the work surface; and
      a second segment comprising a first end which overlaps the second end of the first segment, extending transverse to the first surface of the work surface, and a second end extending parallel to a second surface of the work surface;
   and
   a reamer driver assembly which traverses one of the apertures on the positioning bracket to guide and advance the reaming device through the work surface and first guide hole of the base.

2. The guide fixture of claim 1, wherein the positioning bracket is segmented.

3. A guide fixture for the reaming of a hole in a work surface, comprising:
   a base adapted to rest on a first surface of the work surface, the base comprising a first guide hole extending through the base for acceptance of a reaming device;
   a segmented positioning bracket in adjustable communication with the base and securing the base to the first surface of the work surface, the positioning bracket comprising:
      one or more apertures;
      a generally U-shaped first segment comprising a first end extending parallel to the first surface of the work surface and a second end extending transverse to the first surface of the work surface;
      a generally L-shaped second segment comprising a first end which overlaps the second end of the first segment, extending transverse to the first surface of the work surface, and a second end extending parallel to a second surface of the work surface; and
      means for connecting the first segment of the bracket to the second segment of the bracket;
   and
   a reamer driver assembly which traverses one of the apertures on the positioning bracket to guide and advance the reaming device through the work surface and first guide hole of the base.

4. The guide fixture of claim 1, wherein the base comprises a second guide hole extending through the base for securing the base to the work surface.

5. A guide fixture for the reaming of a hole in a work surface, comprising:
   a base adapted to rest on a first surface of the work surface, the base comprising:
      a first guide hole extending through the base for acceptance of a reaming device; and
      a second guide hole extending through the base for securing the base to the work surface;
   a positioning bracket in adjustable communication with the base and securing the base to the first surface of the work surface, the positioning bracket comprising one or more apertures;

a reamer driver assembly which traverses one of the apertures on the positioning bracket to guide and advance the reaming device through the work surface and first guide hole of the base; and a securing device which traverses the second guide hole, extending through an aperture on the work surface.

6. A guide fixture for the reaming of a hole in a work surface, comprising:

a base adapted to rest on a first surface of the work surface, comprising a first guide hole extending through the base for acceptance of a reaming device;

a positioning bracket in adjustable communication with the base and securing the base to the first surface of the work surface, the positioning bracket comprising one or more apertures;

a reamer driver assembly which traverses one of the apertures on the positioning bracket to guide and advance the reaming device through the work surface and first guide hole of the base; and a bushing disposed within the first guide hole of the base.

7. A guide fixture for the reaming of a hole in a work surface, comprising:

a base adapted to rest on a first surface of the work surface, comprising a first guide hole extending through the base for acceptance of a reaming device;

a positioning bracket in adjustable communication with the base and securing the base to the first surface of the work surface, the positioning bracket comprising one or more apertures;

a reamer driver assembly which traverses one of the apertures on the positioning bracket to guide and advance the reaming device through the work surface and first guide hole of the base; and an adapter fitting connected to a first end of the reaming device.

8. A guide fixture for the reaming of a hole in a work surface, comprising:

a base adapted to rest on a first surface of the work surface, comprising a first guide hole extending through the base for acceptance of a reaming device, and a second guide hole extending through the base for securing the base to the work surface;

a segmented positioning bracket in adjustable communication with the base and securing the base to the first surface of the work surface, the positioning bracket comprising:

one or more apertures;

a first segment comprising a first end extending parallel to the first surface of the work surface and a second end extending transverse to the first surface of the work surface; and a second segment comprising a first end which overlaps the second end of the first segment, extending transverse to the first surface of the work surface, and a second end extending parallel to a second surface of the work surface;

and a reamer driver assembly which traverses one of the apertures on the positioning bracket to guide and advance the reaming device through the work surface and first guide hole of the base.

9. A guide fixture for the reaming of a hole in a work surface, comprising:

a base adapted to rest on a first surface of the work surface, comprising a first guide hole extending through the base for acceptance of a reaming device, and a second guide hole extending through the base for securing the base to the work surface;

a segmented positioning bracket in adjustable communication with the base and securing the base to the first surface of the work surface, the positioning bracket comprising:

one or more apertures;

a generally U-shaped first segment comprising a first end extending parallel to the first surface of the work surface and a second end extending transverse to the first surface of the work surface;

a generally L-shaped second segment comprising a first end which overlaps the second end of the first segment, extending transverse to the first surface of the work surface, and a second end extending parallel to a second surface of the work surface; and a means for connecting the first segment of the bracket to the second segment of the bracket;

and a reamer driver assembly which traverses one of the apertures on the positioning bracket to guide and advance the reaming device through the work surface and first guide hole of the base.

10. The guide fixture of claim 8, further comprising a securing device which traverses the second guide hole, extending through an aperture on the work surface.

11. A guide fixture for the reaming of a hole in a work surface, comprising:

a base adapted to rest on a first surface of the work surface, the base comprising a first guide hole extending through the base for acceptance of a reaming device, and a second guide hole extending through the base for securing the base to the work surface;

a segmented positioning bracket in adjustable communication with the base and securing the base to the first surface of the work surface, the positioning bracket comprising one or more apertures;

a reamer driver assembly which traverses one of the apertures on the positioning bracket to guide and advance the reaming device through the work surface and the first guide hole of the base; and a bushing disposed within the first guide hole of the base.

12. A guide fixture for the reaming of a hole in a work surface, comprising:

a base adapted to rest on a first surface of the work surface, the base comprising a first guide hole extending through the base for acceptance of a reaming device, and a second guide hole extending through the base for securing the base to the work surface;

a segmented positioning bracket in adjustable communication with the base and securing the base to the first surface of the work surface, the positioning bracket comprising one or more apertures;

a reamer driver assembly which traverses one of the apertures on the positioning bracket to guide and advance the reaming device through the work surface and the first guide hole of the base; and an adapter fitting connected to a first end of the reaming device.

13. A method of reaming a hole in a work surface, comprising:

determining the diameter of the hole to be reamed in the work surface, based on the diameter of an existing hole to be reamed in the work surface;

positioning a base of a guide fixture apparatus on a first surface of the work surface so that a first guide hole of the base aligns with the hole to be reamed on the work surface;

securing the base to the work surface;

installing a shank end of a reaming device of the desired diameter through the hole to be reamed in the work surface and through the first guide hole of the base;

securing a positioning bracket to the base;

mounting a reamer driver assembly through an aperture in the positioning bracket so that a first end of the reamer driver assembly is in communication with a chamfered end of the reaming device; and advancing the reaming device through the hole to be reamed in the work surface by means of the reamer driver assembly while rotating the reaming device to provide a cutting action.

14. The method of claim 13, wherein the reaming device is rotated by means of a drive motor or other suitable rotational means.

15. The method of claim 13, wherein the reaming is performed on a work surface comprising an aircraft component work surface.

* * * * *